US008392873B2

United States Patent
Agrawal et al.

(10) Patent No.: US 8,392,873 B2
(45) Date of Patent: Mar. 5, 2013

(54) METHODS AND APPARATUS FOR IMPLEMENTING MODEL-BASED SOFTWARE SOLUTION DEVELOPMENT AND INTEGRATED CHANGE MANAGEMENT

(75) Inventors: Hiralal Agrawal, Bridgewater, NJ (US); Devasis Bassu, Flanders, NJ (US); Ashish Jain, Bridgewater, NJ (US); Rabih Zbib, Cambridge, MA (US)

(73) Assignee: TTI Inventions C LLC, Wilmington, DE (US)

( * ) Notice: Subject to any disclaimer, the term of this patent is extended or adjusted under 35 U.S.C. 154(b) by 1832 days.

(21) Appl. No.: 11/329,541

(22) Filed: Jan. 11, 2006

(65) Prior Publication Data

US 2006/0168557 A1 Jul. 27, 2006

Related U.S. Application Data

(60) Provisional application No. 60/647,316, filed on Jan. 26, 2005.

(51) Int. Cl.
*G06F 9/44* (2006.01)
(52) U.S. Cl. ........ 717/104; 717/100; 717/101; 717/105; 717/106; 717/107; 717/120
(58) Field of Classification Search .......................... None
See application file for complete search history.

(56) References Cited

U.S. PATENT DOCUMENTS

| | | | | |
|---|---|---|---|---|
| 6,061,515 A | * | 5/2000 | Chang et al. | 717/114 |
| 6,263,492 B1 | * | 7/2001 | Fraley et al. | 717/107 |
| 6,349,404 B1 | * | 2/2002 | Moore et al. | 717/104 |
| 6,473,794 B1 | * | 10/2002 | Guheen et al. | 709/223 |
| 6,591,272 B1 | * | 7/2003 | Williams | 1/1 |
| 6,684,388 B1 | * | 1/2004 | Gupta et al. | 717/136 |
| 6,968,538 B2 | * | 11/2005 | Rust et al. | 717/108 |
| 2002/0199031 A1 | * | 12/2002 | Rust et al. | 709/315 |
| 2003/0196168 A1 | * | 10/2003 | Hu | 715/513 |
| 2004/0015822 A1 | * | 1/2004 | Linton et al. | 717/104 |
| 2004/0030421 A1 | * | 2/2004 | Haley | 700/49 |
| 2004/0103393 A1 | * | 5/2004 | Reddy et al. | 717/122 |
| 2005/0091635 A1 | * | 4/2005 | McCollum et al. | 717/101 |
| 2006/0101397 A1 | * | 5/2006 | Mercer et al. | 717/120 |

OTHER PUBLICATIONS

Rapanotti et al. Architecture-driven Problem Decomposition. Proceedings of the 12th IEEE International Requirements Engineering Conference [online] (Sep. 6, 2004). IEEE, pp. 1-10. Retrieved From the Internet <http://www.re04.org/main/papers.htm>.*
Boehm, Barry W. et al.; "Understanding and Controlling Software Costs," IEEE Transactions on Software Engineering; vol. 14, No. 10; Oct. 1988; pp. 1462-1477.

* cited by examiner

*Primary Examiner* — Emerson Puente
*Assistant Examiner* — Jonathan R Labud
(74) *Attorney, Agent, or Firm* — Fitch, Even, Tabin & Flannery LLP

(57) ABSTRACT

The present invention concerns methods and apparatus for implementing a model-based paradigm for use in developing systems of software solutions. In a method of the present invention, a developer defines templates for use in creating software architecture elements which comprise a software solution or a system of software solutions. The template definitions comprise specifications of template attributes. The developer specifies relationships and dependencies among the templates using a computer programmed to receive the template definitions.

40 Claims, 8 Drawing Sheets

METHODS AND APPARATUS FOR IMPLEMENTING MODEL-BASED SOFTWARE SOLUTION DEVELOPMENT AND INTEGRATED CHANGE MANAGEMENT

RELATED APPLICATION

This application claims the benefit of U.S. Provisional Application No. 60/647,316 filed Jan. 26, 2005, which is incorporated by reference.

TECHNICAL FIELD

The present invention generally concerns software systems, and more particularly concerns methods and apparatus for performing model-based development of software solutions which facilitate development of systems of software solutions and simplify change management in systems of software solutions.

BACKGROUND

The development of systems of software solutions can be particularly complex and difficult to manage. Software developers are tasked with authoring multiple solutions which often depend on common resources or use similar software functionality. However, the common resources or similar software functionality is often not developed in a coordinated manner. Accordingly, when a software developer tasked with authoring a new software solution seeks to draw upon already-authored common resources or common software functionality, the software developer may be confronted with resources that are specified in an unfamiliar manner; structured in an unfamiliar way; or which are poorly documented. This makes it difficult for a software developer to adapt pre-existing resources and code to a software authoring task, often resulting in needless aggravation, duplication of effort and inefficiency.

These problems also negatively impact the integration of multiple software solutions. Often, software solutions which are to be integrated draw upon common resources or software functionality. However, common resources or software functionality may be tailored for use with a particular one of the software solutions, and may not integrate well (or at all) with other of the software solutions to be integrated. This situation, like the previous situation associated with authoring a new software solution, often results in needless aggravation, duplication of effort and inefficiency. The needless aggravation and inefficiency is caused by the need to modify resources and common software functionality so that it can be used in a software solution for which it was not designed.

Similar problems are encountered when a change needs to be spawned throughout a system of software solutions. Due to poor documentation or software authoring practices, dependencies among software components may be poorly understood. Accordingly, when a change is made to a particular software component, it may be difficult to discover what other software components need to be modified in order to accommodate the change in the particular software component.

Accordingly, those skilled in the art desire a model-based software development paradigm and tools that impose regularity on software authoring tasks, particularly software authoring tasks involving systems of software solutions. In particular, those skilled in the art desire a model-based software development paradigm that creates software components using a pre-defined framework, wherein the pre-defined framework is comprised of well-defined artifacts that in some way record and preserve dependencies among the artifacts comprising the framework. In addition, those skilled in the art desire a software development paradigm that eliminates needless duplication of effort by drawing upon pre-existing artifacts for use in authoring new software solutions. Further, those skilled in the art desire a model-based software development paradigm and tools that greatly simplify change management and implementation.

SUMMARY OF THE PREFERRED EMBODIMENTS

The foregoing and other problems are overcome, and other advantages are realized in accordance with the following embodiments of the present invention.

A first embodiment of the invention comprises a method for implementing model-based design of a software solution, the method comprising: defining a template model of the software solution comprised of a plurality of templates, wherein defining a template model further comprises: defining attributes for each of the templates; defining code generators for each of the templates; and defining template dependencies among templates comprising the plurality.

In one variant of the first embodiment the method further comprises: defining an architecture model for the software solution comprised of a plurality of architecture elements, wherein defining an architecture model further comprises: creating the architecture elements; defining an element type for each of the architecture elements; populating the architecture elements with attributes; and defining relationships between the architecture elements.

A second embodiment of the invention comprises a method for authoring a software solution using a model-based software architecture paradigm, the method comprising: defining a software solution architecture, wherein defining the software solution architecture further comprises: creating solution architecture elements, wherein the solution architecture elements are comprised of attributes; populating the attributes of the solution architecture elements; and identifying dependency relations between the architecture elements; creating software artifacts for each architecture element; and establishing dependencies between the software artifacts, wherein the dependencies between the software artifacts correspond to the dependency relations established between the architecture elements.

A third embodiment of the invention comprises a memory medium storing a computer program for execution by a digital processor of a computer system, whereby when executed the computer program provides a graphical user interface for creating a template definition environment for use in authoring a software solution using a model-based architecture paradigm, the computer program performing operations when executed by the digital processor, the operations comprising: displaying a graphical user interface corresponding to the template definition environment, wherein the graphical user interface comprises: template creation controls for creating templates; template dependency controls for creating dependency relationships among templates created using the template creation controls; and a display area for depicting icons corresponding to templates created using the template creation controls and relationships among the templates; receiving commands entered using the template creation controls and template dependency controls to create templates and template dependencies; and displaying the templates and template dependencies created using the template creation controls and template dependency controls.

A fourth embodiment of the present invention comprises a memory medium storing a computer program for execution by a digital processor of a computer system, whereby when executed the computer program provides a graphical user interface for creating an architecture definition environment for use in authoring a software solution using a model-based architecture paradigm, the computer program performing operations when executed by the digital processor, the operations comprising: displaying a graphical user interface corresponding to the architecture definition environment, wherein the graphical user interface comprises: architecture element creation controls for creating architecture elements; architecture element dependency controls for specifying dependencies among architecture elements; and a display area for depicting icons corresponding to the architecture elements and relationships among the architecture elements; receiving commands entered using the architecture element creation controls and architecture element dependency controls; and displaying icons corresponding to the architecture elements and architecture element dependencies created using the architecture element creation controls and architecture element dependency controls.

A fifth embodiment of the present invention comprises a computer system for use in authoring a software solution using a model-based architecture paradigm, the computer system comprising: memory means to store at least one computer program, whereby when executed the at least one computer program provides graphical user interfaces for use in authoring the software solution; display means for displaying the graphical user interfaces; input means for receiving inputs from a user of the computer system for interacting with the graphical user interfaces; and digital processor means coupled to the memory means, display means and input means for executing the at least one computer program, whereby when the at least one computer program is executed the following operations are performed: receiving a command to access at least one of a template definition environment and an architecture definition environment, whereby when a command to access a template definition environment is received, the following operations are performed: displaying a graphical user interface corresponding to the template definition environment, wherein the graphical user interface comprises: template creation controls for creating templates; template dependency controls for creating dependency relationships among templates created using the template creation controls; and a display area for depicting icons corresponding to templates created using the template creation controls and relationships among the templates; receiving commands entered using the template creation controls and template dependency controls to create templates and template dependencies; and displaying the templates and template dependencies created using the template creation controls and template dependency controls; and whereby when a command to access an architecture definition environment is received, the following operations are performed: displaying a graphical user interface corresponding to the architecture definition environment, wherein the graphical user interface comprises: architecture element creation controls for creating architecture elements; architecture element dependency controls for specifying dependencies among architecture elements; and a display area for depicting icons corresponding to the architecture elements and relationships among the architecture elements; receiving commands entered using the architecture element creation controls and architecture element dependency controls; and displaying icons corresponding to the architecture elements and architecture element dependencies created using the architecture element creation controls and architecture element dependency controls.

In conclusion, the foregoing summary of the embodiments of the present invention is exemplary and non-limiting. For example, one skilled in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

In conventional practice, it is difficult, time consuming and inefficient to assemble software solutions comprised of multiple systems. Consider a system of systems which manages, provisions, monitors, and bills for services. For each of the activities, there may be a separate system. The systems are integrated using Enterprise Application Integration (EAI) and strategies. Such systems experience continuous change as a business evolves. Evolution may involve offering of new services, changing terms of old services, retiring old features, adding customers, and so on. The present invention implements a method and system which uses a model-driven approach during initial development of such systems. Further, methods and apparatus of the present invention provide a mechanism for performing integrated change management to isolate changes required as systems evolve. In embodiments of the invention, a wizard-driven approach for making changes is provided, which propagates change-impact results to all the components impacted due to modified functionality, and provides the end-user with an appropriate GUI-based editor to resolve the changes.

The system of the present invention works by understanding software systems as systems of systems and modeling each system as either an application or infrastructure component. Each component has associated with it application resources or infrastructure resources. Resources have well-defined information content which is used by components. For example, a component may use a text file as a resource.

The component is programmed to interact with, or interpret the text. An example of a component programmed to interact with text is a spell checker. Resources may be more structured such as, for example, a data file with a well-defined schemata. A component programmed to interact with such a data file resource may comprise a data file viewer. The data file viewer component would be programmed to interpret semantics behind the fields in the data file so that the data file viewer component can perform appropriate manipulations of the data. These components and resources are generically referred to as "architecture elements".

Figure 1:
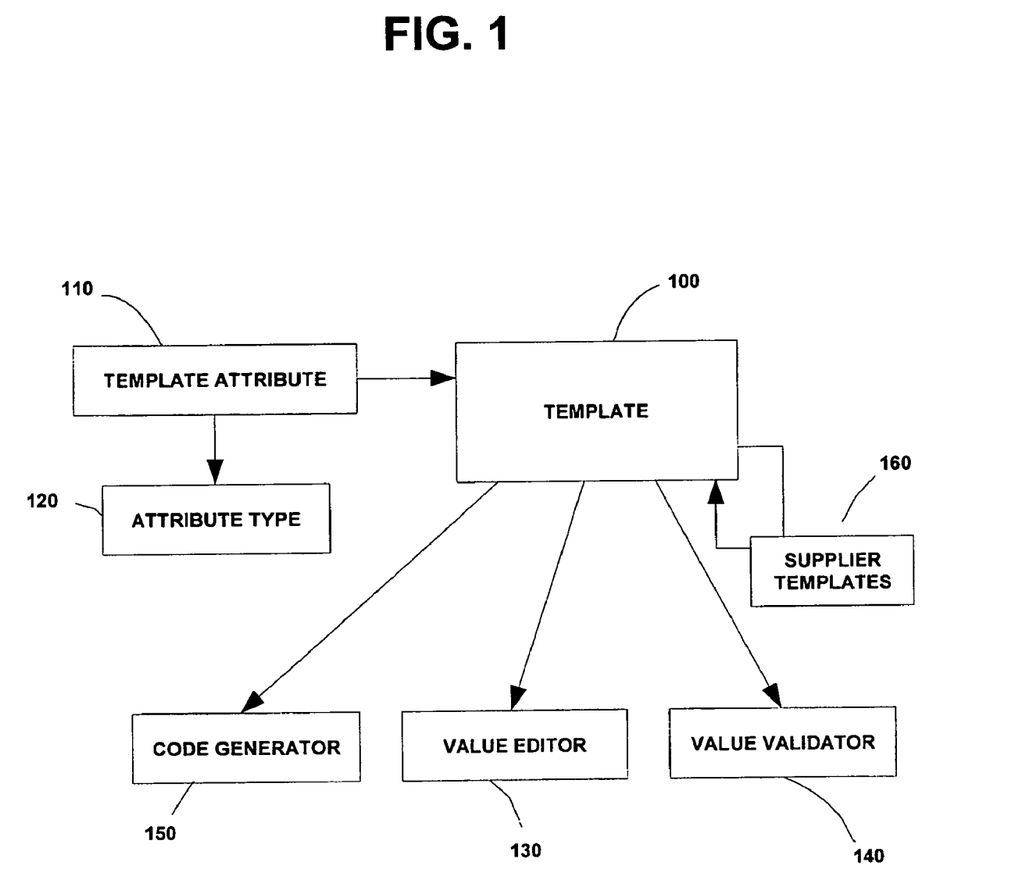
FIG. 1 depicts a template definition structure in accordance with the present invention.

Components and resources in the system are based on patterns called templates. The system of the invention includes a graphical environment for definition of templates. As shown in FIG. 1, a template 100 comprises at least a template attribute 110, a template attribute type 120, a value editor 130, a value validator 140, a code generator 150, and supplier templates 160. A template attribute 110 is an argument or environment variable whose value is used when the architecture element is implemented and/or deployed. Every template attribute is based on a template attribute type. A template attribute type 120 defines the type of the template attribute. The type has a type name; a value editor 130; and a value validator 140. The value editor 130 is specific to the attribute type. The value editor 130 allows only values that are legal for the corresponding type to be edited. For instance, if the type is a directory, then the editor may comprise a dialog box that allows the user to choose a directory that exists on the local system. The value validator 140 is also specific to type. The value validator 140 validates whether a given value is a legal value for the corresponding template attribute type. The template definition also identifies a set of other templates that the template depends on. These templates are called supplier templates 160. Template definitions may also reflect the fact that a particular template may be defined in part in relation to another template called a base template. A template inherits the attributes and dependent templates from its immediate base template. A template also recursively inherits the attributes and dependent templates from the base templates of its base templates. The template definition further comprises a code generator 150. The template code generator 150 utilizes the template attribute values and those of supplier templates to automatically generate, for example, parts of the software artifacts that are associated with an architecture element based on the template.

Figure 2:
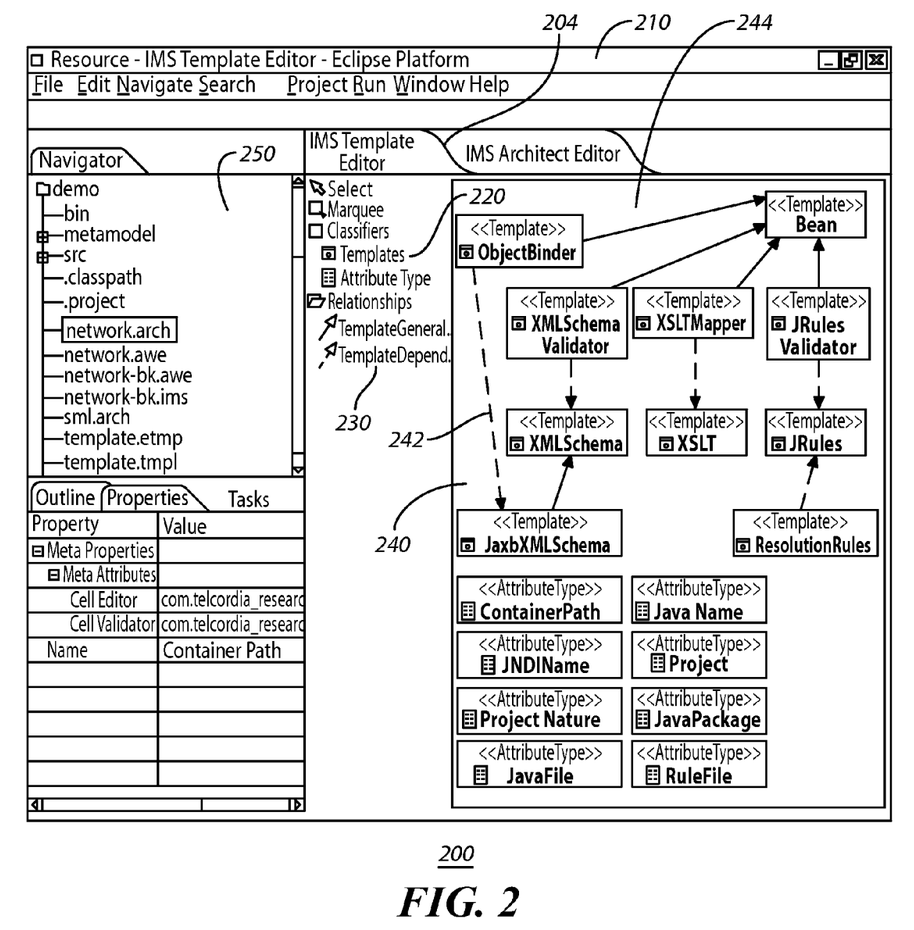
FIG. 2 depicts a graphical user interface operating in accordance with the present invention for creating template definitions and for defining dependencies among groups of templates.

FIG. 2 depicts a graphical user interface 200 implementing a template definition graphical environment 210 for creating template definitions and for defining dependencies among groups of templates. The template definition graphical environment 210 allows the creation of: new templates and template attributes; new template types; binary relations of dependency from a template to its supplier templates; and binary relations of generalization from a template to its base templates. The template definition graphical environment is accessed through tab 204. As is seen, the template definition graphical environment has controls 220 for creating templates and controls 230 for defining relationships among templates. The relationships may comprise template dependencies and template generalizations. The template definition graphical environment further comprises a display area 240 for depicting both icons corresponding to templates created using the template creation controls 220 and graphical elements indicative of relationships among the templates created using the template relationship controls 230. As is seen, relationships corresponding to template dependencies 242 and template generalizations 244 are represented in the display area 240. The graphical user interface 200 further comprises a file area 250 for navigating among template definitions created using the template definition graphical environment.

The template definition graphical environment enforces a set of constraints in order to ensure that users create proper templates. These constraints are:

If a template A is the base template of another template B, then template B cannot be the base template of template A.

The attribute type value editor should provide a set of specific callback functions by implementing a predefined interface. The attribute type value validator should provide a set of specific callback functions by implementing a predefined interface.

The template code generator should provide a set of specific callback functions by implementing a predefined interface.

The system of the present invention provides a function for exporting template definitions in formats that are suitable for use in defining architecture elements.

The system and methods of the present invention also provide an environment for the definition of architecture and design of information systems and systems of information systems. The architecture definition is comprised of entities which represent information systems or information system modules. In the system of the present invention these entities are called architecture elements. These are system modules that provide (or support) certain business functionality which is sufficiently independent. The architecture definition environment allows elements of two types to be defined: components and resources. Components are systems or system modules that perform certain business functionality. Resources contain information which is used by components.

In the Architecture Definition Environment, the components and resources can be of two types: infrastructure components and application components. Infrastructure components and resources are instantiated only once in a certain context of the solution regardless of the number or type of business application that use them. For example, a component that a client message against an interface definition specified as an XML W3C schema is needed to be instantiated once in the solution. All business applications that are defined as part of this solution then use this. Application components and resources are instantiated once per business application in a certain solution. For instance, in a solution that provisions and activates telecommunication services, each service has a set of validity constraints that define the set of valid messages. Each set of these constraints would be defined in a system operating in accordance with the present invention as an application component.

In the present invention, the definition of an architecture element is comprised of the following: the element name; the element type; an identification of the template on which the element is based; and element attributes. The architecture element name is unique within a solution architecture. The element type identifies both whether the element is a component or a resource, and whether it is an application element or infrastructure element. The template that the element is based on is called the underlying template of the element. The element is said to instantiate its underlying template. The element attributes comprise at least a set of software artifacts that provide the implementation corresponding to the architecture element and a set of other architecture elements that the element depends on. These elements are called the Supplier Elements.

The architecture definition environment enforces a set of constraints on the architecture elements defined, in order to insure that the user creates a correct architecture. These constraints are:

An element that is a resource cannot depend on an element that is a component

An infrastructure element cannot depend on an application element.

Figure 3:
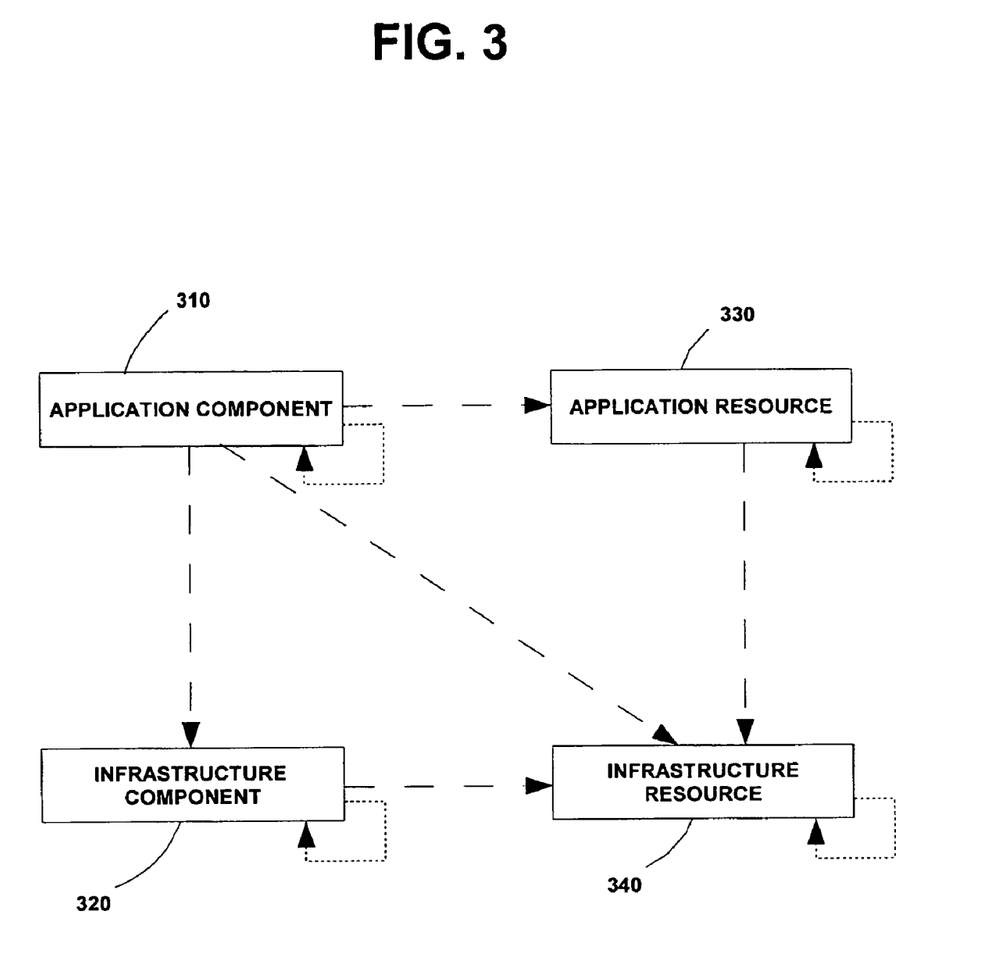
FIG. 3 depicts relations between different parts of a solution architecture model in the present invention.

FIG. 3 depicts relations between different parts of a solution architecture model and shows dependencies that may be defined between different architecture elements based on their context (i.e. whether they are components or resources, and whether they are application or infrastructure components). As is apparent, an application component 310 can depend on either itself, or an infrastructure component 320, or an application resource 330, or an infrastructure resource 340. An infrastructure component 320 can depend on either itself or an infrastructure resource 340. An application resource 330 can depend on either itself or an infrastructure resource 340.

Figure 4:
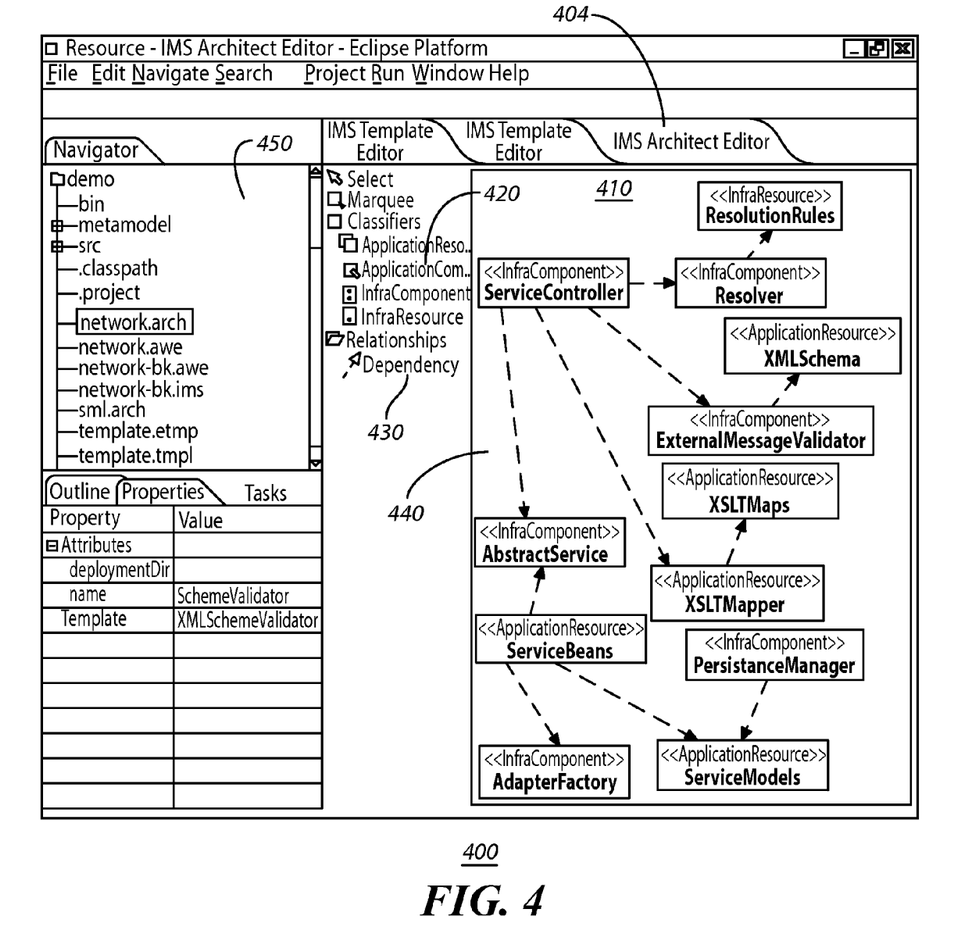
FIG. 4 depicts a graphical user interface operating in accordance with the present invention for creating a solution architecture.

FIG. 4 depicts a graphical user interface 400 implementing a solution architecture definition environment 410 operating in accordance with the present invention for creating solution architectures and for defining dependencies among architecture elements comprising the solution architecture. The solution architecture definition environment 410 allows the creation of both new architecture elements and architecture element dependencies. The solution architecture definition environment 410 is accessed through tab 404. As is seen, the solution architecture definition environment 410 has controls 420 for creating architecture elements by classifying templates incorporated in the solution architecture. The solution architecture definition environment 410 also has controls 430 for defining relationships among architecture elements. The solution architecture definition environment 410 further comprises a display area 440 for graphically depicting both icons corresponding to architecture elements and relationships among architecture elements. The graphical user interface 400 further comprises a file area 450 for navigating among items created using the template definition graphical environment and the solution architecture definition environment.

In addition to the operations described above, the solution architecture definition environment also permits a user to manage multiple applications and associated software artifacts through a common interface. For example, the solution architecture definition environment allows a user to: browse all existing applications; create and delete applications; browse all software artifacts associated with an application, and edit these artifacts using editors that are content-specific to each of the artifacts; and create and delete software artifacts associated with an application. These operations are performed, at least in part, by navigating among the items shown in file area 450.

Figure 5:
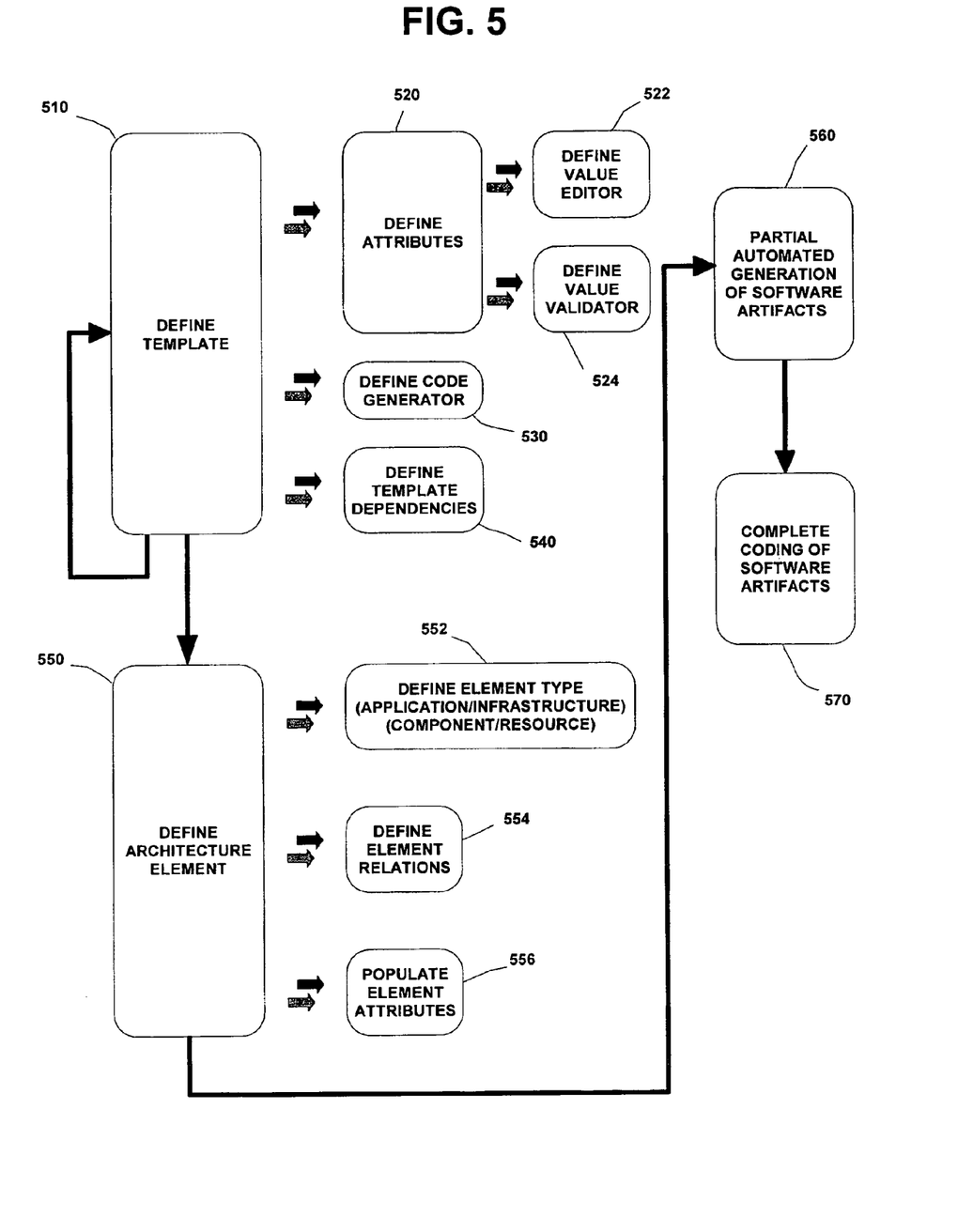
FIG. 5 is a flowchart summarizing aspects of methods operating in accordance with the present invention.
Figure 6:
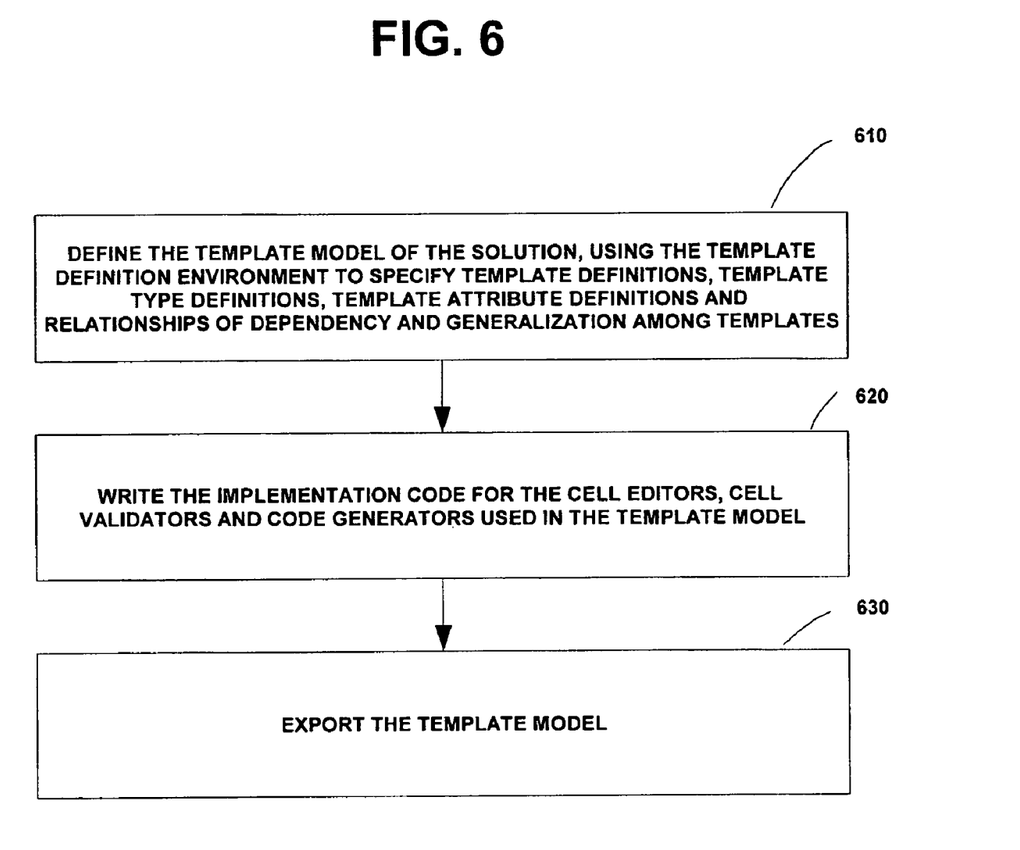
FIG. 6 is a flowchart depicting definition of a template in accordance with methods of the present invention.
Figure 7:
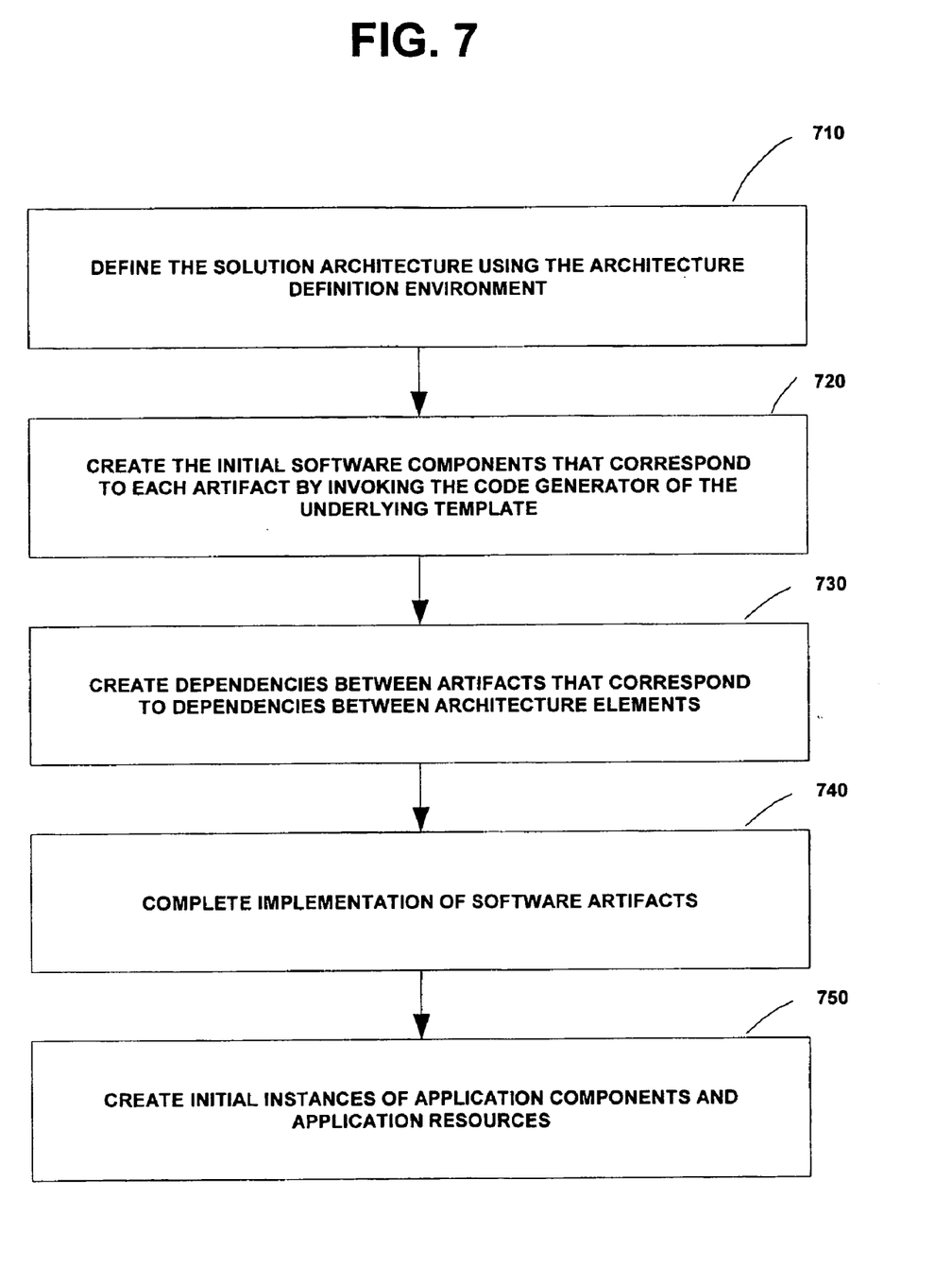
FIG. 7 is a flowchart depicting definition of a solution architecture in accordance with methods of the present invention.

In the following section, the method and process for developing an information system in accordance with the present invention is described. FIG. 5 depicts in summary form aspects of methods of the present invention, while FIGS. 6-7 depict in greater detail specific methods of the present invention. As shown in FIG. 5, the first action taken is to define templates needed for a particular solution at 510. Defining templates further comprises defining attributes at 520; defining code generators at 530; and defining template dependencies at 540. Defining attributes 520 further comprises defining a value editor at 522 and a value validator at 524.

Next, the architecture elements of a solution are defined at 550. This comprises defining element types (application/infrastructure and component/resource) at 552; defining element relations at 554; and populating element attributes at 556.

Then, the partial automated generation of software artifacts occurs at 560, followed by the complete coding of software artifacts at 570.

Aspects of the method depicted in FIG. 5 will now be described in greater detail with reference to FIGS. 6-7. FIG. 6 depicts the creation of a template model for a solution. At step 610, a developer defines the template model of the solution, using the template definition environment. The template model includes template definitions, template type definitions, template attribute definitions, and relationships of dependency and generalization between templates. Then, at step 620, the designer writes the implementation code for all the cell editors, cell validators and code generators used in the template model. Next, at step 630, the designer exports the template model. An important advantage of the present invention is that a template model can be reused in more than one solution architecture.

FIG. 7 depicts the steps of a method for creating a solution architecture in accordance with the present invention. At step 710, a developer defines the solution architecture using the solution architecture definition environment. This step comprises creating the solution architecture elements (components and resources). This step also comprises populating the attributes of the architecture elements. The solution architecture definition environment uses the attribute type value editor and validator to provide an editing module that is specific to the attribute type and that allows only correct values for the attribute. The attribute type value editor and validator are obtained from the underlying template. For example, a template attribute of type Java Name has a validator that ensures that the value of the editor is a valid Java identifier name as it is defined in the Java Programming Language Specification. For another example, a template attribute of type directory has an editor that provides the user with a graphical element that allows the user to choose a directory that already exists on the system where the solution is developed. Step 710 additionally comprises designating the set of supplier architecture elements by creating binary relations dependency. Next, at step 720, the developer creates the initial software components that correspond to each artifact by invoking the code generator of the underlying template. The code generator can use the element attribute values as parameters in the initial generation of the artifacts. Then, at step 730, the system of the present invention creates a dependency between the artifacts that correspond to dependencies between architecture elements created in the solution architecture. For example, if an architecture element A depends on an architecture element B, then the system creates a dependency between the software artifacts of A, $SA_A$ and the software artifacts of B, $SA_B$. Next, at step 740, the developer completes the implementation of the software artifacts. Then, at step 750, the developer creates initial instances of application components and application resources.

Figure 8:
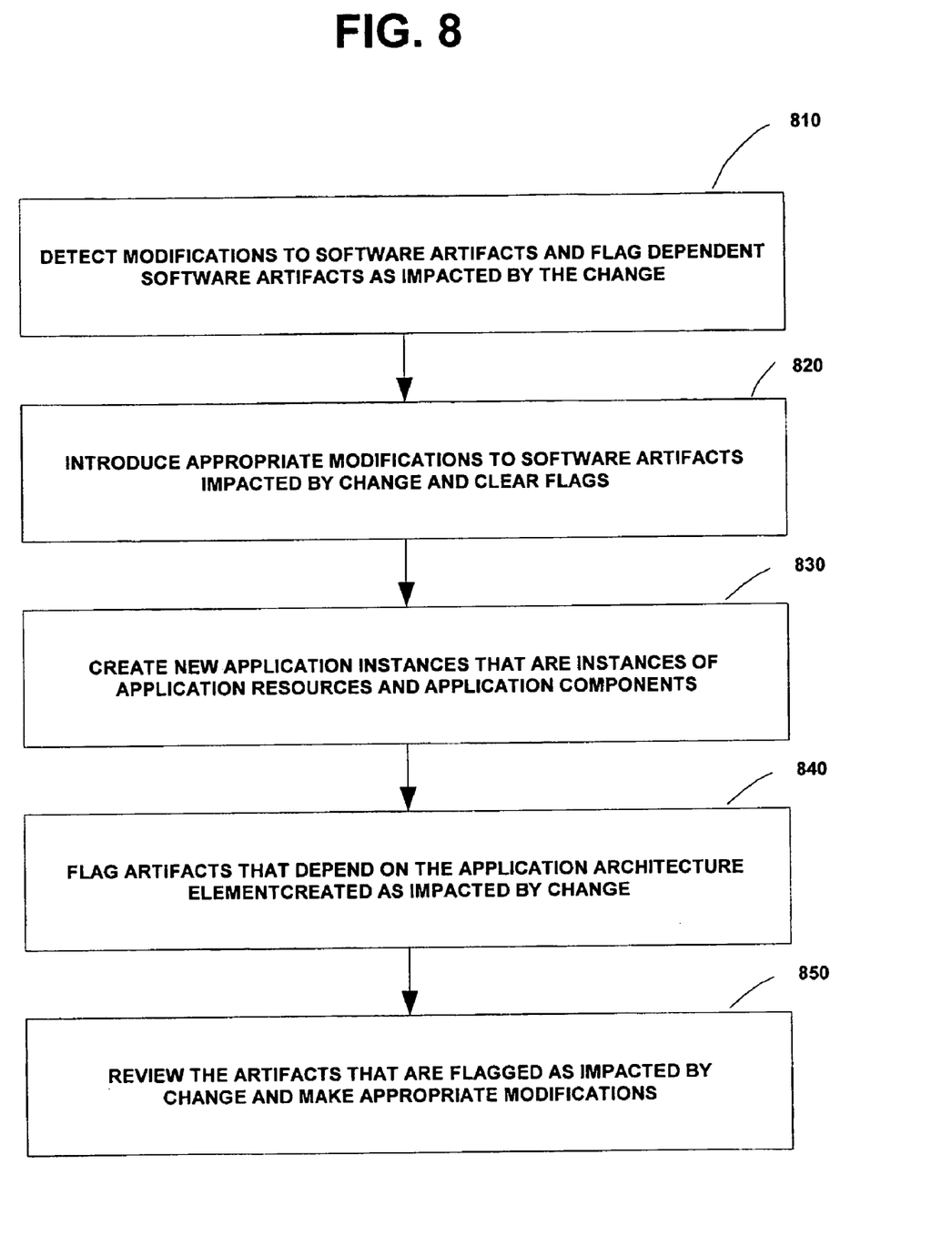
FIG. 8 is a flowchart depicting change management in accordance with methods of the present invention.

The preceding methods depicted in, and described with respect to, FIGS. 6-7 show how the present invention provides an initial implementation of a solution. The steps depicted in FIG. 8 illustrate how a method of the invention provides integrated change management for solution implementation. The method is described with respect to an example where an architecture element A depends on architecture element B. Software artifacts $SA_A$ associated with architecture element A likewise depend on software architecture elements $SA_B$ associated with architecture element B. It is assumed that a developer introduces a change in the software artifacts, $SA_B$, which implement architecture element B. The method detects the change in $SA_B$ at step 810. Because there is a dependency specified between architecture elements A and B, the system identifies $SA_A$ by flagging these artifacts as impacted by a change, in particular the change to $SA_B$. Next, at step 820, the developer reviews the artifacts that are flagged as impacted by change, and introduces the appropriate modifications to $SA_A$. The developer then clears the impacted by change flag from the artifacts $SA_A$. Next, at step 830 the developer creates new application instances that are instances of application resources and application components. Then at step 840 the system flags artifacts that depend on the application architecture elements created in step 830 as impacted by change. Next, at step 850, the developer reviews the artifacts that are flagged as impacted by change, and applies appropriate modifications to them.

One skilled in the art will understand that the methods depicted in FIGS. 5-8 can be embodied in a physical memory medium readable by digital processing apparatus associated with a computer system in other embodiments made in accordance with the invention. In these embodiments of the invention, computer program instructions of a computer program fixed in the physical memory medium are capable of performing operations corresponding to the steps of the method when executed by a digital processing apparatus. Physical machine-readable memory media include, but are not limited to, hard drives, CD- or DVD-ROM, flash memory storage devices, or RAM memory of a computer system. Other embodiments of the present invention comprise computer systems having at least a memory for storing computer programs capable of performing methods of the present invention when executed; a display, one or more user input devices; and a digital processor coupled to the memory, display and one or more input devices.

Thus it is seen that the foregoing description has provided by way of exemplary and non-limiting examples a full and informative description of the best methods and apparatus presently contemplated by the inventor for implementing model-based software solution development and integrated change management. One skilled in the art will appreciate that the various embodiments described herein can be practiced individually; in combination with one or more other embodiments described herein; or in combination with software system development environments differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. An article of manufacture including a non-transitory computer-readable medium having instructions stored thereon that cause the computing device to perform operations comprising:
   providing a template definition environment graphical user interface comprising:
      template creation controls configured to create templates;
      template dependency controls configured to create dependency relationships among templates,
      wherein a display area is configured to depict icons corresponding to templates and relationships among the templates; and
      a template attribute editor configured for development of code generators used to generate software artifacts associated with an architecture element based on the template;
   receiving commands entered using the template creation controls and template dependency controls to create templates and template dependencies;
   displaying the templates and template dependencies created using the template creation controls and template dependency controls;
   providing an architecture definition environment graphical user interface
   comprising:
      architecture element creation controls configured to create architecture elements;
      architecture element dependency controls configured to specify dependencies among architecture elements,
      wherein the display area is further configured to depict icons corresponding to the architecture elements and relationships among the architecture elements;
      a software component editor configured to invoke the code generator of the underlying template to generate software artifacts associated with the underlying template attribute editor;
   receiving commands entered using the architecture element creation controls and architecture element dependency controls;
   displaying icons corresponding to the architecture elements and architecture element dependencies created using the architecture element creation controls and architecture element dependency controls;
   generating a software solution comprising an arrangement of the software artifacts according to the dependencies between the plurality of architecture elements;
   detecting at least one modification to a template, template relationship, architecture element, or architecture element dependency; and
   identifying the templates and architecture elements affected by the at least one modification by using the relationships between individual ones of the templates and the relationships between individual ones of the architecture elements.

2. The article of manufacture of claim 1 wherein the architecture elements comprise application components.

3. The article of manufacture of claim 1 wherein the architecture elements comprise application resources.

4. The article of manufacture of claim 1 wherein the architecture elements comprise infrastructure components.

5. The article of manufacture of claim 1 wherein the architecture elements comprise infrastructure resources.

6. The article of manufacture of claim 1 wherein the architecture definition environment graphical user interface further comprises:
   application browsing controls for allowing browsing of the plurality of applications comprising the software solution.

7. The article of manufacture of claim 1 wherein the architecture definition environment graphical user interface further comprises:
   creation and deletion controls for allowing creating new applications and deleting existing applications.

8. The article of manufacture of claim 1 wherein the computer-readable medium further comprises instructions stored thereon that cause the computing device to perform operations comprising:

providing software artifact browsing controls configured to allow browsing software artifacts associated with software solutions.

9. The article of manufacture of claim 1 wherein the comprises:
creation and deletion controls for allowing creating new software artifacts and deleting existing software artifacts.

10. A computer system comprising:
means for defining a template model of the software solution comprised of a plurality of templates, wherein defining a template model further comprises:
defining at least one attribute for at least one of the templates;
defining at least one code generator for at least one of the templates; and
defining at least one template dependency between one of the templates and at least one other of the templates;
means for defining an architecture model for the software solution comprised of a plurality of architecture elements, wherein individual ones of the plurality of architectural elements are based on at least one template from among the plurality of templates, wherein defining an architecture model further comprises:
defining an element type for at least one of the plurality of architecture elements;
populating the plurality of architecture elements with at least one attributes; attribute;
defining relationships between one of the architecture elements and at least one other of the architecture elements;
means for instantiating the plurality of architecture elements as a plurality of software artifacts in the software solution, wherein a code generator related to the template associated with the individual ones of the plurality of architecture elements generates at least a portion of software code for a resulting software artifact;
means for identifying at least one modified software artifact within the software solution; and
means for using relationships defined between architecture elements instantiated by the at least one software artifact and the at least one template dependency to identify affected architecture elements and templates affected by the at least one modified software artifact.

11. The computer system of claim 10 wherein the means for defining a template model further comprises:
means for defining at least a part of at least one template in relation to a base template, wherein the at least one template inherits attributes associated with the base template.

12. The computer system of claim 10 wherein the means for defining a template model further comprises:
means for identifying supplier templates upon which at least one template depends.

13. The computer system of claim 10 further comprising means for enforcing rules regarding permitted dependencies between templates comprising the template model as template dependencies are defined.

14. The computer system of claim 10 further comprising means for creating at least one of the plurality of architecture elements by selecting an appropriate template created when defining a template model for the software solution for use in creating a particular architecture element, such that the particular architecture element instantiates the template.

15. The computer system of claim 10 further comprising means for enforcing rules regarding permitted relationships between the plurality of architecture elements comprising an architecture model as architecture element relationships are defined.

16. The computer system of claim 10 further comprising:
means for modifying other software artifacts having a relationship with the at least one modified software artifact to accommodate modification made to the at least one modified software artifact.

17. A method comprising:
implementing a template model in a system configured to provide a graphical environment for defining templates and relations between templates;
implementing an architecture model in the system, wherein individual ones of the architecture elements instantiate at least one attribute defined within an individual template;
generating a software solution comprising software artifacts structured according to the relations defined in the template model and the architecture model;
managing software authoring and revision tasks in a system configured to propagate changes through the software solution to components of the template model and architecture model impacted by changes in the software solution based at least in part on the relations defined in the template model and the architecture model;
identifying using a computing device conflicting changes to the components of the template model and architecture model; and
resolving conflicting changes to the components of the template model and architecture model.

18. The method of claim 17 further comprising generating the template model according to enterprise requirements.

19. The method of claim 17 further comprising defining a plurality of templates comprising components and resources with the template model.

20. The method of claim 17 wherein at least one of the templates inherits attributes and dependent templates from an immediate base template.

21. A method comprising:
defining a plurality of templates using a computing device, individual templates further comprising at least one attribute, individual attributes being associated with an attribute type and a code generator corresponding to the attribute type, wherein the code generator is configured to generate software artifacts according to the attribute type;
defining relations between individual ones of the plurality of templates using a computing device;
defining a plurality of architecture elements using a computing device, individual one of the plurality of architecture elements instantiating at least one template, possessing an architecture element type, and comprising at least one attribute associated with an underlying template selected from among the plurality of templates;
defining relations between the individual ones of the plurality of architecture elements using a computing device;
generating a software solution using a computing device, the software solution comprising an arrangement of the software artifacts according to the relations between the plurality of architecture elements;
using a computing device to detect at least one modification to a template, template relationship, architecture element, or architecture element relationship; and
using a computing device to identify templates and architecture elements affected by the detected modification by using the relations between the individual ones of the plurality of templates or the relations between the individual ones of the plurality of architecture elements.

22. The method of claim 21 wherein defining the code generator further comprises defining at least one value editor associated with the attribute type.

23. The method of claim 21 wherein defining the code generator further comprises defining at least one value validator associated with the attribute type.

24. The method of claim 21 wherein defining relations between individual ones of the plurality of templates further comprises defining a dependency between a template and a supplier template, wherein certain individual attributes of an individual template relate to attributes defined within at least one other template.

25. The method of claim 21 wherein defining relations between individual ones of the plurality of templates further comprises defining a generalization between a template and a base template, wherein certain individual attributes of an individual template relate to attributes defined within at least one other template.

26. The method of claim 21 further comprising enforcing constraints on the relations between individual ones of the plurality of templates using a computing device, the constraints associated with dependency or generalization relations.

27. The method of claim 21 wherein defining a plurality of architecture elements further comprises defining the architecture element type for individual ones of the architecture elements as infrastructure component, application component, infrastructure resource, or application resource.

28. The method of claim 21 further comprising enforcing constraints on the relations between individual ones of the plurality of architecture elements using a computing device, the constraints being associated with the architecture element type possessed by individual ones of the architecture elements.

29. An article of manufacture including a non-transitory computer-readable medium having instructions stored thereon that cause the computing device to perform operations comprising:
   implementing a template model in a system configured to provide a graphical environment for defining templates and relations between templates;
   implementing an architecture model in the system, wherein individual ones of the architecture elements instantiate at least one attribute defined within an individual template;
   generating a software solution comprising software artifacts structured according to the relations defined in the template model and the architecture model;
   managing software authoring and revision tasks in a system configured to propagate changes through the software solution to components of the template model and architecture model impacted by changes in the software solution based at least in part on the relations defined in the template model and the architecture model;
   identifying using a computing device conflicting changes to the components of the template model and architecture model; and
   receiving input for resolving conflicting changes to the components of the template model and architecture model.

30. The article of manufacture of claim 29, the operations further comprising generating the template model according to enterprise requirements.

31. The article of manufacture of claim 29, the operations further comprising defining a plurality of templates comprising components and resources with the template model.

32. The article of manufacture of claim 29 wherein at least one of the templates inherits attributes and dependent templates from an immediate base template.

33. A computer system comprising:
   means for implementing a template model in a system configured to provide a graphical environment for defining templates and relations between templates;
   means for implementing an architecture model in the system, wherein individual ones of the architecture elements instantiate at least one attribute defined within an individual template;
   means for generating a software solution comprising software artifacts structured according to the relations defined in the template model and the architecture model;
   means for managing software authoring and revision tasks in a system configured to propagate changes through the software solution to components of the template model and architecture model impacted by changes in the software solution based at least in part on the relations defined in the template model and the architecture model;
   means for identifying using a computing device conflicting changes to the components of the template model and architecture model; and
   means for receiving input for resolving conflicting changes to the components of the template model and architecture model.

34. The computer system of claim 33 further comprising means for generating the template model according to enterprise requirements.

35. The computer system of claim 33 further comprising means for defining a plurality of templates comprising components and resources with the template model.

36. The computer system of claim 33 wherein at least one of the templates inherits attributes and dependent templates from an immediate base template.

37. An apparatus comprising:
   one or more computing devices configured to collectively:
      implement a template model in a system configured to provide a graphical environment for defining templates and relations between templates;
      implement an architecture model in the system, wherein individual ones of the architecture elements instantiate at least one attribute defined within an individual template;
      generate a software solution comprising software artifacts structured according to the relations defined in the template model and the architecture model;
      manage software authoring and revision tasks in a system configured to propagate changes through the software solution to components of the template model and architecture model impacted by changes in the software solution based at least in part on the relations defined in the template model and the architecture model;
      identify conflicting changes to the components of the template model and architecture model; and
      receive input for resolving conflicting changes to the components of the template model and architecture model.

38. The apparatus of claim 37 wherein the one or more computing devices are further configured to collectively generate the template model according to enterprise requirements.

39. The apparatus of claim 37 wherein the one or more computing devices are further configured to collectively define a plurality of templates comprising components and resources with the template model.

40. The apparatus of claim 37 wherein at least one of the templates is capable of inheriting attributes and dependent templates from an immediate base template.

* * * * *

UNITED STATES PATENT AND TRADEMARK OFFICE
CERTIFICATE OF CORRECTION

| | | |
|---|---|---|
| PATENT NO. | : 8,392,873 B2 | Page 1 of 1 |
| APPLICATION NO. | : 11/329541 | |
| DATED | : March 5, 2013 | |
| INVENTOR(S) | : Agrawal et al. | |

It is certified that error appears in the above-identified patent and that said Letters Patent is hereby corrected as shown below:

In the Claims

In Column 11, Line 4, in Claim 9, delete "wherein the" and insert -- wherein the architecture definition environment graphical user interface further --, therefor.

In Column 11, Line 28, in Claim 10, delete "attributes;".

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO.         : 8,392,873 B2
APPLICATION NO.    : 11/329541
DATED              : March 5, 2013
INVENTOR(S)        : Agrawal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2013 days.

Signed and Sealed this
Thirtieth Day of December, 2014

Michelle K. Lee
*Deputy Director of the United States Patent and Trademark Office*